US010058152B2

(12) United States Patent
Lin et al.

(10) Patent No.: US 10,058,152 B2
(45) Date of Patent: Aug. 28, 2018

(54) PROTECTIVE CASE

(71) Applicant: Chicony Electronics Co., Ltd., New Taipei (TW)

(72) Inventors: Chung-Yao Lin, New Taipei (TW); Heng-Liang Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 731 days.

(21) Appl. No.: 14/483,459

(22) Filed: Sep. 11, 2014

(65) Prior Publication Data
US 2015/0382488 A1 Dec. 31, 2015

(30) Foreign Application Priority Data
Jun. 26, 2014 (TW) .............................. 103211333 U

(51) Int. Cl.
| | |
|---|---|
| *H05K 5/02* | (2006.01) |
| *A45C 11/00* | (2006.01) |
| *G06F 1/16* | (2006.01) |
| *G06F 3/02* | (2006.01) |

(52) U.S. Cl.
CPC ............ *A45C 11/00* (2013.01); *G06F 1/1626* (2013.01); *G06F 1/1632* (2013.01); *G06F 3/0202* (2013.01); *A45C 2011/003* (2013.01); *G06F 2200/1634* (2013.01)

(58) Field of Classification Search
CPC ............ B65D 5/5206; A45C 2011/002; A45C 2011/003; A45C 11/00; H05K 5/0204; H05K 5/03; G06F 1/1626; G06F 1/1628; G06F 1/1632; G06F 3/0202

USPC .................. 206/45.23, 45.2, 45.24, 320
See application file for complete search history.

(56) References Cited

U.S. PATENT DOCUMENTS

| | | | | |
|---|---|---|---|---|
| 6,992,882 B2* | 1/2006 | Wang | ..................... | G06F 1/1632 248/279.1 |
| 8,520,377 B2* | 8/2013 | Senatori | ................ | G06F 1/1616 361/679.26 |
| 9,377,810 B2* | 6/2016 | Hishinuma | ........... | G06F 1/1613 |
| 2003/0052856 A1* | 3/2003 | Nakamura | ............ | G06F 1/1616 345/110 |
| 2009/0178938 A1* | 7/2009 | Palmer | ...................... | A45C 5/03 206/45.23 |
| 2011/0297566 A1* | 12/2011 | Gallagher | ............ | F16M 11/105 206/320 |
| 2012/0217175 A1* | 8/2012 | Oskuie | .................. | G06F 1/1628 206/45.24 |
| 2012/0300381 A1* | 11/2012 | Hung | .................... | G06F 1/1632 361/679.09 |

(Continued)

*Primary Examiner* — Steven A. Reynolds
(74) *Attorney, Agent, or Firm* — Chun-Ming Shih; HDLS IPR Services

(57) ABSTRACT

A protective case includes a housing, a base, and a connecting piece. A supporting groove is openly formed on one surface of the base for engaging a lateral edge of the housing. The connecting piece is soft and flexible. The connecting piece has two opposite end portions and a middle section disposed between the two end portions. The two end portions are connected to the housing and the base respectively, and the middle section is disposed in a removably detachable manner. Therefore, the supporting groove supports the housing to stand on the base, and the connecting piece can fix the housing to prevent toppling.

9 Claims, 11 Drawing Sheets

(56) References Cited

U.S. PATENT DOCUMENTS

| | | | | |
|---|---|---|---|---|
| 2013/0128453 A1* | 5/2013 | Lin | ............... | G06F 3/0202 |
| | | | | 361/679.56 |
| 2013/0240382 A1* | 9/2013 | Ledesma | ............ | A45C 11/00 |
| | | | | 206/45.24 |
| 2013/0313142 A1* | 11/2013 | Wen | ............... | A45C 11/00 |
| | | | | 206/320 |
| 2015/0359120 A1* | 12/2015 | Huang | ............ | A45C 11/00 |
| | | | | 206/45.23 |
| 2016/0128439 A1* | 5/2016 | Senatori | ............ | G06F 1/162 |
| | | | | 206/45.2 |

* cited by examiner

PROTECTIVE CASE

BACKGROUND

1. Technical Field

The present invention relates to a protective case, and, in particular, to a protective case used on a portable electronic device.

2. Related Art

In order to operate a tablet computer, a conventional portable keyboard has a slot disposed thereon, and such that the tablet computer can be inserted into the slot and stand thereon. The drawbacks of this structure lie in that, when the tablet computer is under an external force or the portable keyboard inclines, the tablet computer may possibly incline, fall off from the slot, and topple over. Moreover, the slot on the portable keyboard is designed to be adapted to the tablet computer, so the tablet computer cannot be used along with the portable keyboard and a protective case at the same time.

In view of the foregoing, the inventor made various studies to improve the above-mentioned problems to realize the improvements, on the basis of which the preset invention is accomplished.

BRIEF SUMMARY

It is an objective of the present invention to provide a protective case to contain a portable electronic device, and the protective case can support the portable electronic device to stand and also prevent the portable electronic device from toppling.

Accordingly, the present invention provides a protective case comprising a housing, a base, and a connecting piece. A supporting groove is disposed on one surface of the base for inserting a lateral edge of the housing. The connecting piece is soft and flexible. The connecting piece has two opposite end portions and a middle section disposed between the two end portions. The two end portions are connected to the housing and the base respectively, and the middle section is disposed in a removably detachable manner. The supporting groove supports the housing to stand on the base, and the connecting piece can fix the housing to prevent toppling.

Preferably, a clasping member is disposed on the lateral edge of the housing, and a contacting portion is protrudingly disposed inside the supporting groove and corresponding to the clasping member to prevent the housing from being detached and falling off from the supporting groove. One of the end portions of the connecting piece is attached to one surface of the housing, and an accommodating space is formed on the other surface of the housing to contain the portable electronic device. On the surface of the housing, a locating slot is concavely formed and has a shape corresponding to a contour of the end portion, so that the end portion can be attached inside the locating slot.

Preferably, the base comprises a top cover and a bottom cover correspondingly closed. The supporting groove is formed on the top cover, and the other end portion of the connecting piece can be attached to the other surface of the base or be sandwiched between the top cover and the bottom cover. An input device can be disposed on the top cover of the base.

Preferably, the connecting pieces are plural in number, and a material composing the connecting piece includes PU, knitted fabric, or leather. A through hole can also be formed on the middle section of the connecting piece for cables/wires to pass through and be inserted into the portable electronic device to make connection. A total length from the lateral edge of the housing to where the middle section of the connecting piece connects the housing is approximately equal to a length of the middle section, so that when the protective case is closed, the connecting piece can be closely attached to the housing.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
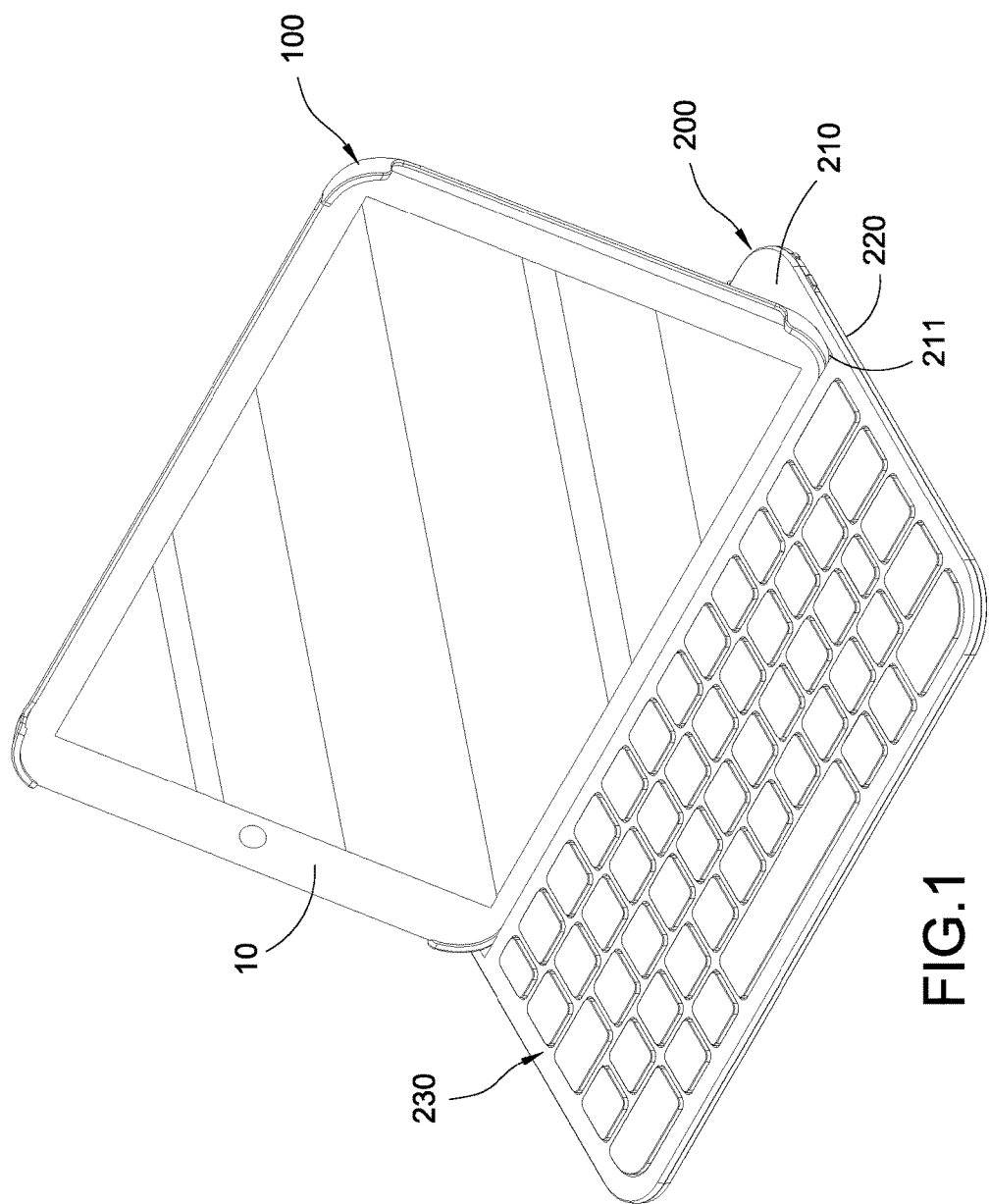
FIG. 1 is a schematic view of a use state of a protective case according to the first embodiment of the present invention.
Figure 2:
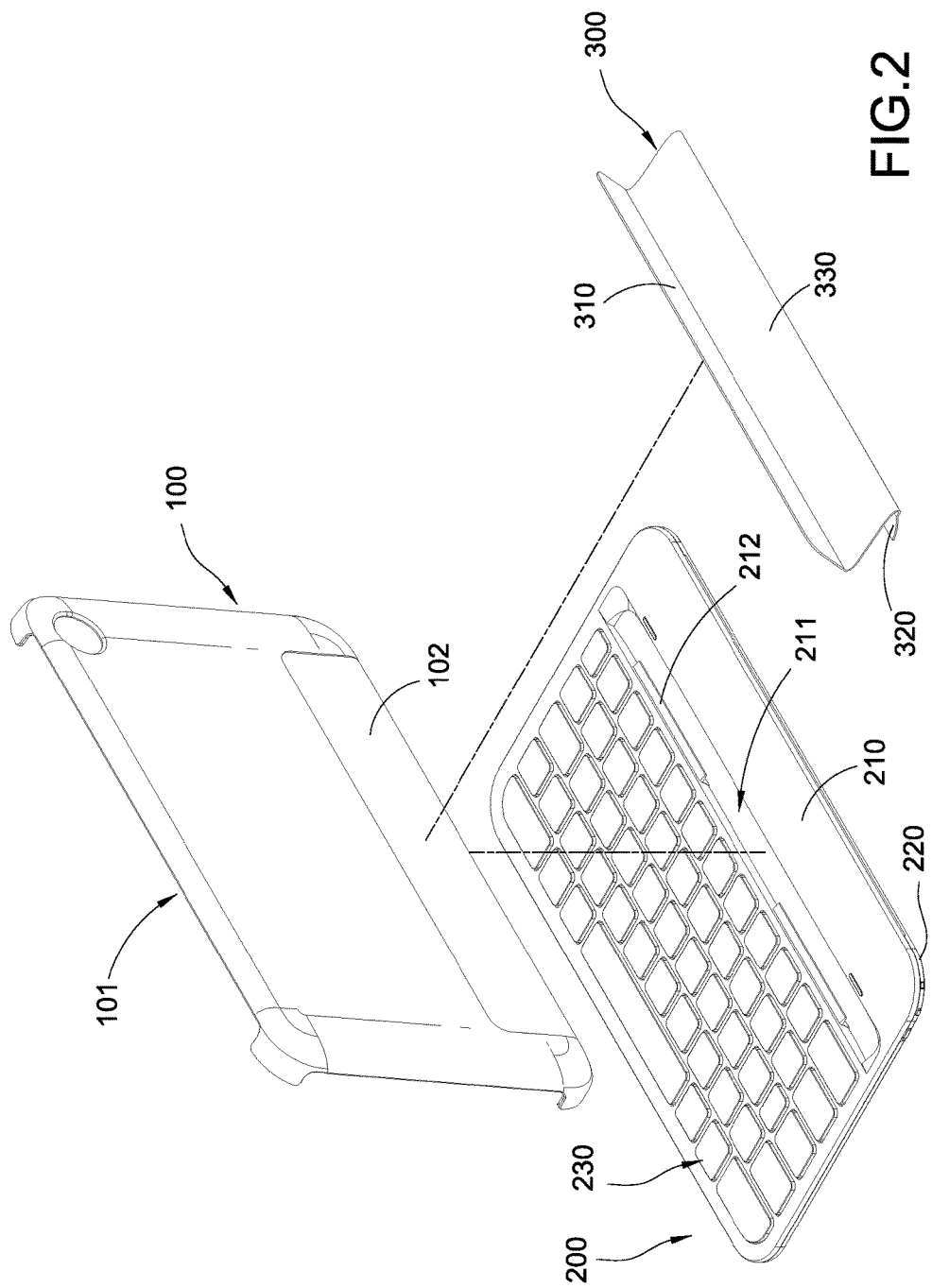
FIG. 2 is a perspective exploded view of the protective case according to the first embodiment of the present invention.
Figure 3:
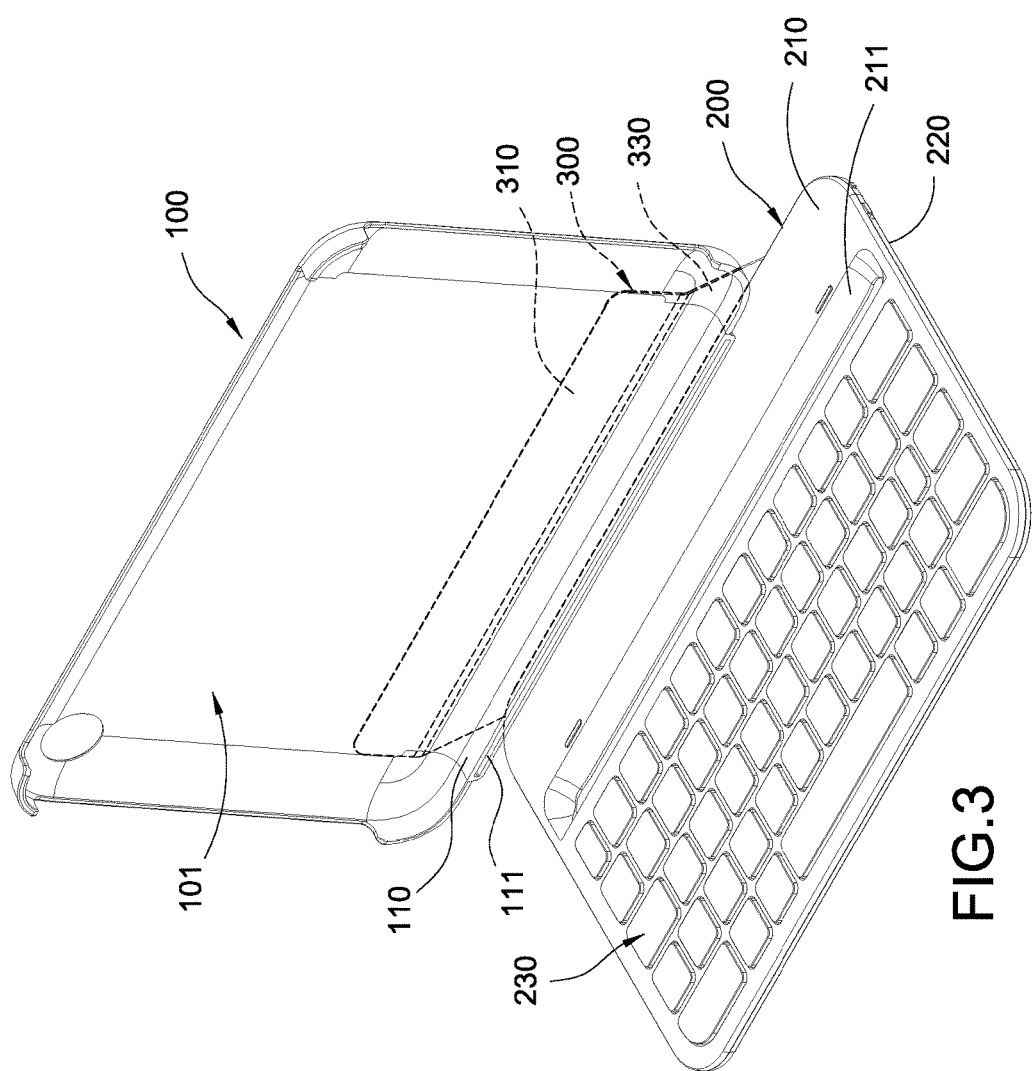
FIG. 3 is a perspective view of the protective case according to the first embodiment of the present invention.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Referring to FIGS. 1 to 4, a protective case is provided in the first embodiment of the present invention. The protective case is used on a portable electronic device (e.g. a tablet computer or a smart mobile phone). The protective case of the present invention comprises a housing 100, a base 200, and a connecting piece 300.

According to the present embodiment, the housing 100 is preferably flat and rectangular in shape. The periphery of the housing 100 preferably bends toward one surface of the housing 100 to form an accommodating space 101 thereon. The accommodating space 101 is used to contain the portable electronic device 10 and the bending periphery of the housing 100 can engage a lateral edge of the portable electronic device 10 to fix the portable electronic device 10 inside the accommodating space 101. A locating slot 102 is concavely formed on the other surface of housing 100, which is opposite to the accommodating space 101. A clasping member 111 is disposed on a lateral edge 110 of the housing 100.

Figure 4:
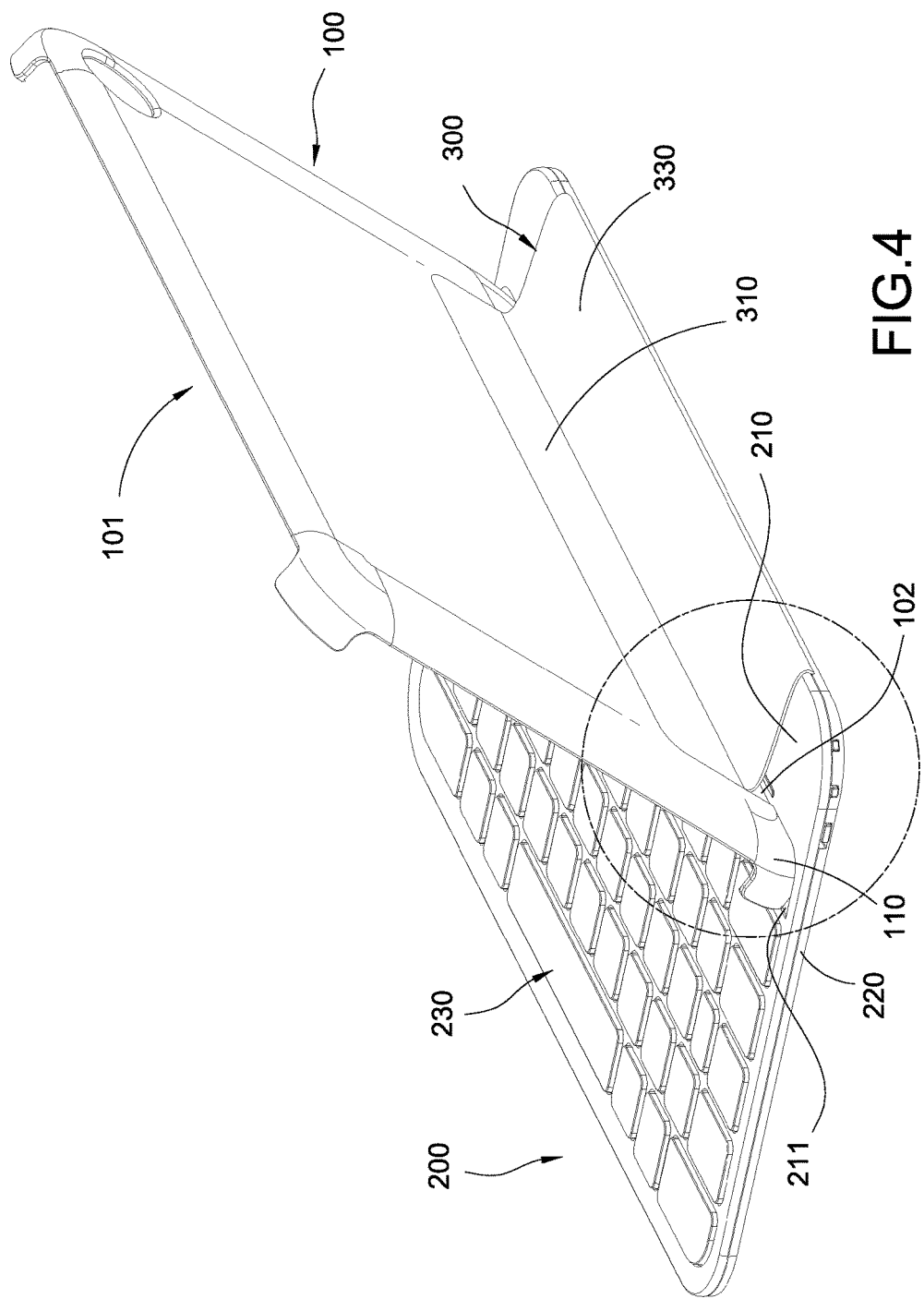
FIG. 4 is another perspective view of the protective case according to the first embodiment of the present invention.
Figure 5:
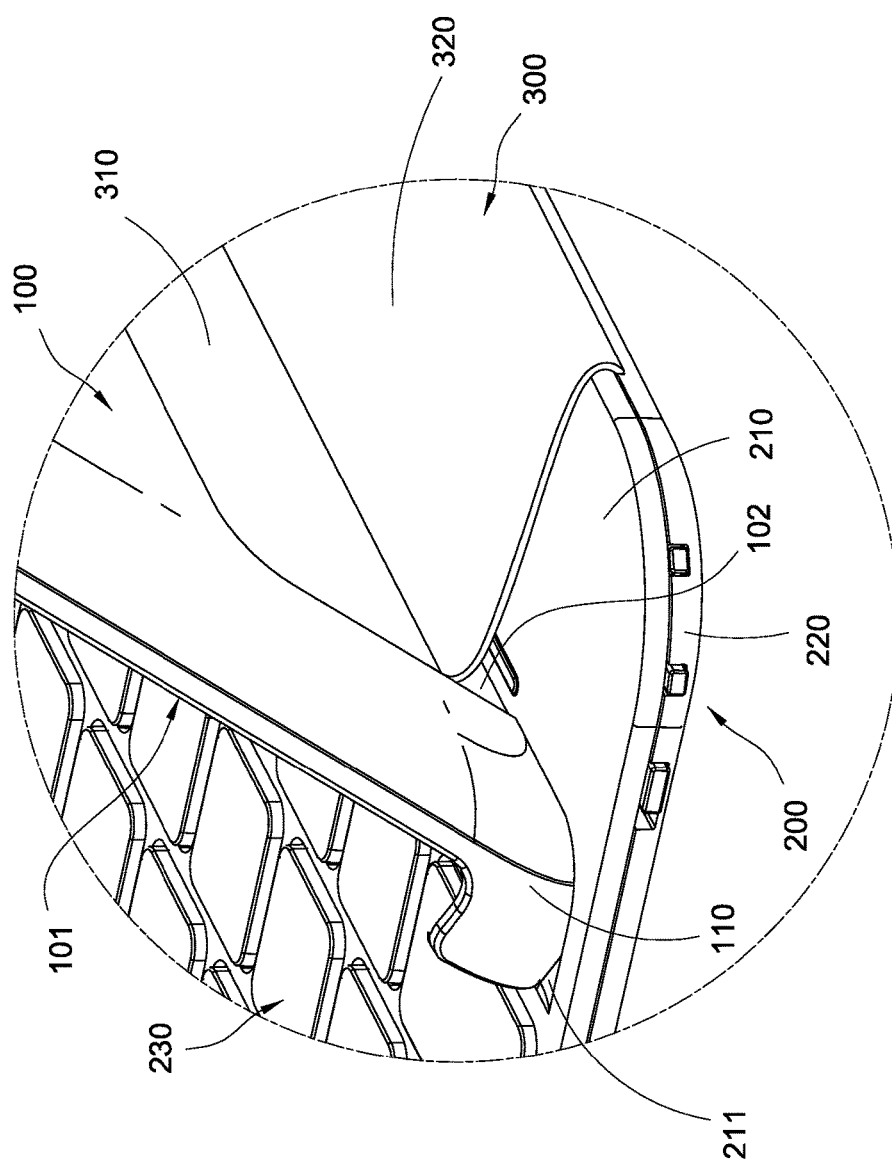
FIG. 5 is a partially enlarged view of FIG. 4.

Referring to FIGS. 4 to 6, in the present embodiment, the base 200 is preferably hollow, flat, and rectangular in shape. The base 200 is constituted by a top cover 210 and a bottom cover 220 correspondingly closed. A supporting groove 211 is concavely formed on an outer surface of the top cover 210 for inserting the lateral edge 110 of the housing 100 into the supporting groove 211. An inner wall of the supporting groove 211 inclines, so as to form an angle ranging from 115 degrees to 120 degrees between the housing 100 and the base 200. At least one contacting portion 212 corresponding to the clasping member 111 is protrudingly disposed inside the supporting groove 211. According to the present embodiment, there are preferably two contacting portions 212 disposed inside the supporting groove 211; however, the present invention is not limited thereto. The base 200 has an input device 230 disposed thereon. According to the present embodiment, the input device 230 is preferably disposed on the upper cover 210, and can transmit wireless signals to the portable electronic device 10 to operate it. Thereby, a relative position between the input device 230 and the portable electronic device 10 is suitable for a user's operation.

The connecting piece 300 is soft and flexible. According to the present embodiment, the connecting piece 300 is preferably composed of PU, knitted fabric, or leather. The connecting piece 300 has two opposite end portions 310 and 320 and a middle section 330 between the two end portions 310 and 320. The end portions 310 and 320 are connected to the housing 100 and the base 200, respectively. Preferably, the one end portion 310 of the connecting piece 300 is attached to one surface of the housing 100 which is opposite to the accommodating space 101, and a shape of the end portion 310 is corresponding to a contour of the locating slot 102 on this side, so that the end portion 310 can be attached inside the locating slot 102. The end portion 310 is attached by using a heat press adhesive, a pressure sensitive adhesive (e.g., a twin adhesive tape), or other adhesives; however, the present invention is not limited to these kinds of adhesives. According to the present invention, it is preferable that the connecting piece 300 is adhered to the housing 100 by using the heat press adhesive, wherein the end portion 310 of the connecting piece 300 is accurately in alignment with the locating slot 102, and then a thermoset process is performed on the heat press adhesive to accurately attach the connecting piece 300 to the housing 100. The other end portion 320 of the connecting piece 300 is preferably sandwiched between the top cover 210 and the bottom cover 220 of the base 200, so as to be fixed to the base 200.

Figure 6A:
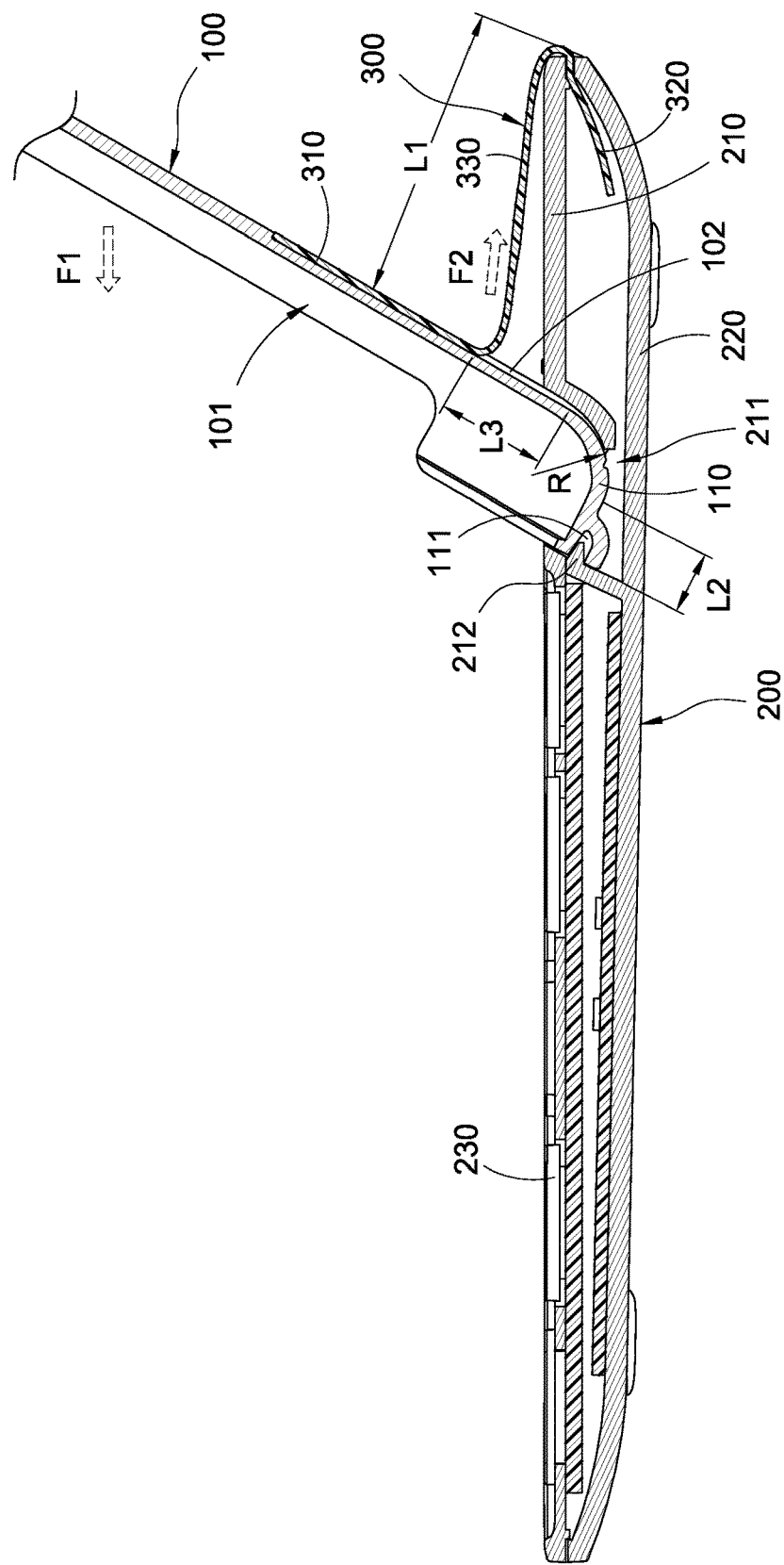
FIG. 6A is a sectional view of the protective case according to the first embodiment of the present invention.
Figure 6B:
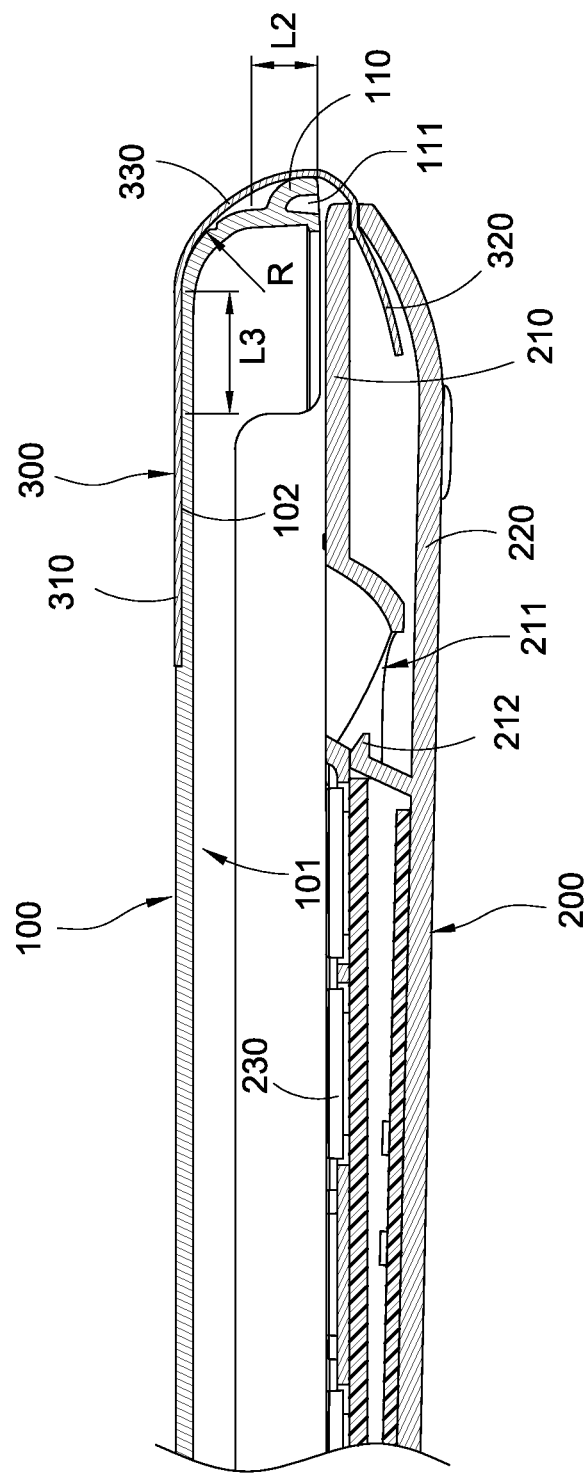
FIG. 6B is another sectional view of the protective case according to the first embodiment of the present invention.
Figure 7:
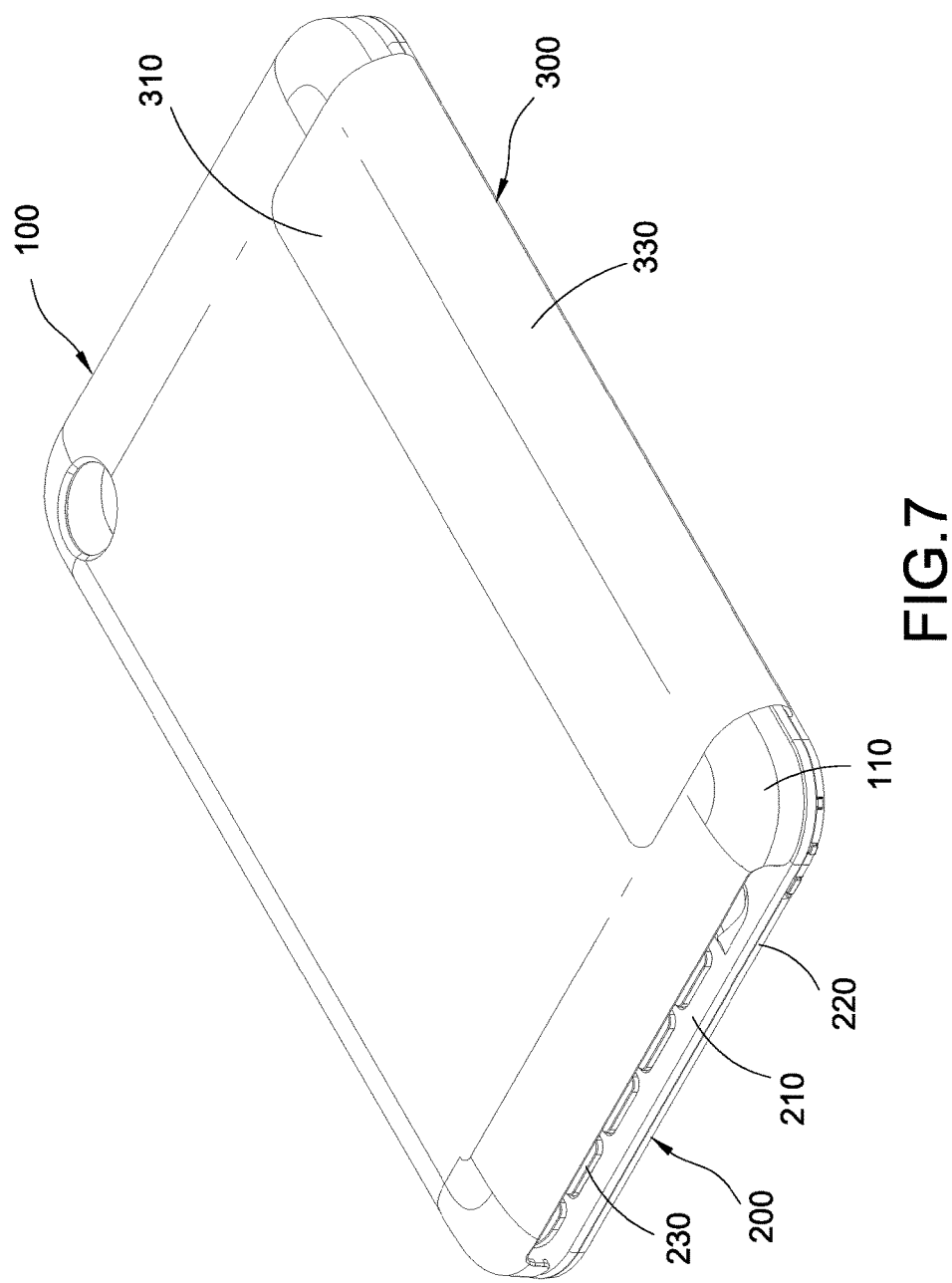
FIG. 7 is another perspective view of the protective case according to the first embodiment of the present invention.

Refer to FIGS. 6A, 6B, and 7, between a boundary of the housing 100 and the lateral edge 110 of the housing 100, a total length which is a sum of a lateral height L2, a plane width L3, and an arc length R is approximately equal to a length L1 of the middle section 330 of the connecting piece 300, and, preferably, the length L1 is longer. Therefore, as shown in FIG. 6B, when carrying the portable electronic device 10, the housing 100 and the base 200 are overlapped, so as to protect the portable electronic device 10 accommodated in the housing 100, and the middle section 330 of the connecting piece 300 can be closely attached to the lateral edge 110 of the housing 100.

According to the present invention, the protective case utilizes the supporting groove 211 of the base 200 to support the housing 100, so that the housing 100 can inclinedly stand on the base 200. The housing 100 is prevented from being detached and falling off from the supporting groove 211 by using the contacting portion 212 of the supporting groove 211 to engage with the clasping member 111 of the housing 100. The housing 100 obtains a supporting force by making the clasping member 111 of the lateral edge 110 of the housing 100 in contact against the contacting portion 212 inside the supporting groove 211, and such that, to remove the housing 100 from the supporting groove 211, a user only needs to incline forward the housing 100 to disengage the clasping member 111 of the lateral edge 110 from the contacting portion 212. However, there possibly occur circumstances, such as the housing 100 is inclined when carried around by the user, or is under external collisions, or is affected by other external factors, and thereby the housing 100 is accidentally under a pushing force F1 in a forward direction to be inclined forward or detached, and further, the portable electronic device 10 on the housing 100 is damaged. Therefore, the connecting piece 300 is used to connect the housing 100 to fix it, so that even if the housing 100 is accidentally inclined forward, the connecting piece 300 provides to the housing 100 a pulling force F2 relative to the base 200, which acts against the pushing force F1, so as to prevent the housing 100 from toppling and falling off from the supporting groove 211.

Figure 8:
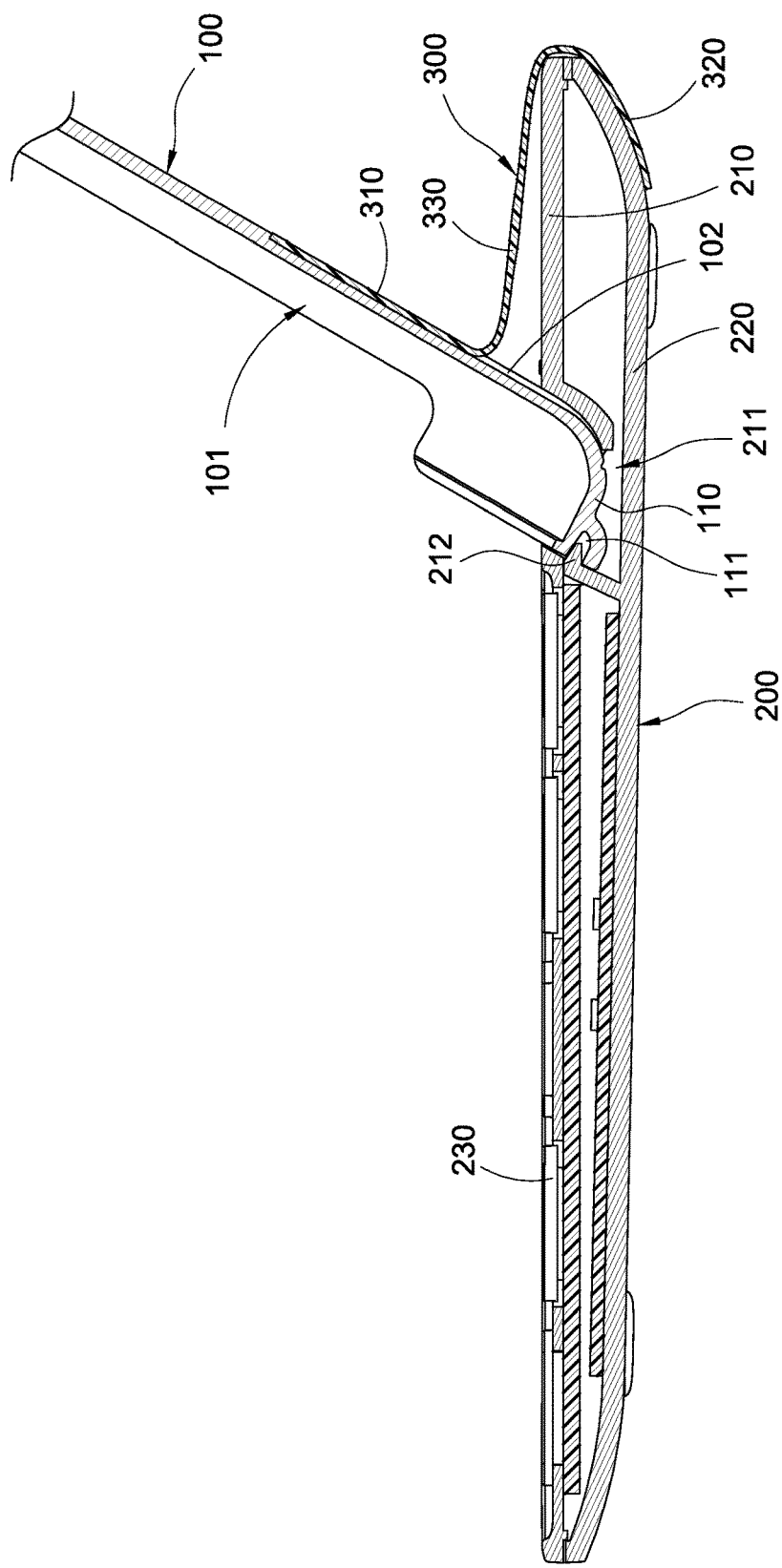
FIG. 8 is a schematic view of a protective case according to the second embodiment of the present invention.

Referring to FIG. 8, the second embodiment of the present invention provides a protective case which has a structure similar to the foregoing first embodiment. The similarities between the present embodiment and the first embodiment are not repeated herein while their differences are described hereinafter. According to the present embodiment, one end portion 310 of the connecting piece 300 is attached to the housing 100, and the other end portion 320 is attached to an outer surface of the bottom cover 220 of the base 200, and it is preferable that the end portion 320 is adhered to the bottom cover 220 by the heat press adhesive.

Figure 9:
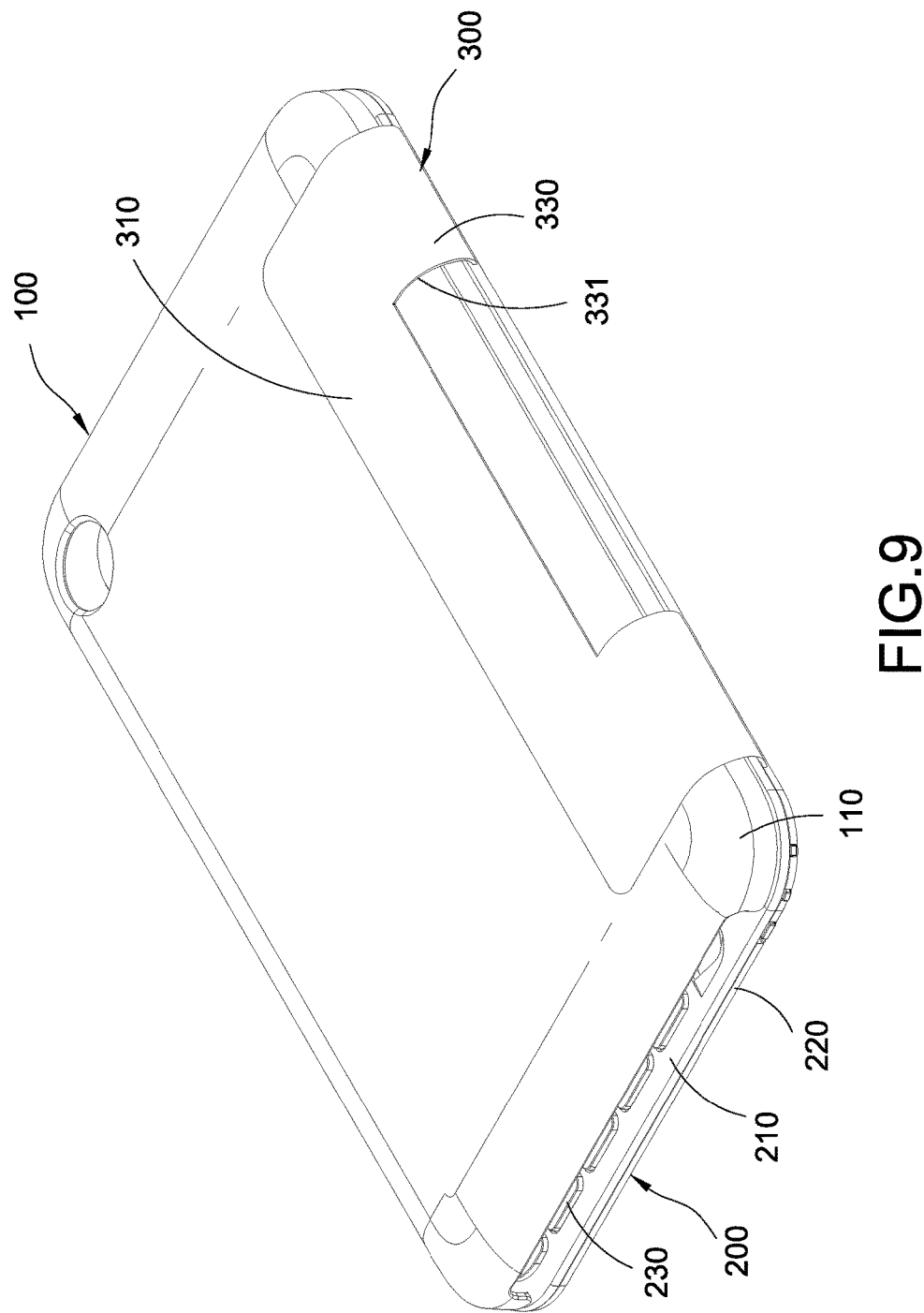
FIG. 9 is a perspective view of a protective case according to the third embodiment of the present invention.

Referring to FIG. 9, the third embodiment of the present invention provides a protective case which has a structure similar to the foregoing first embodiment. The similarities are not repeated herein. The differences between the present embodiment and the first embodiment are described hereinafter. According to the present embodiment, a through hole 331 is formed on the middle section 330 of the connecting piece 300. Thereby, when a connector is disposed on the lateral edge of the portable electronic device 10, a corresponding connecting cable can be inserted and connected to the connector via the through hole 331.

Figure 10:
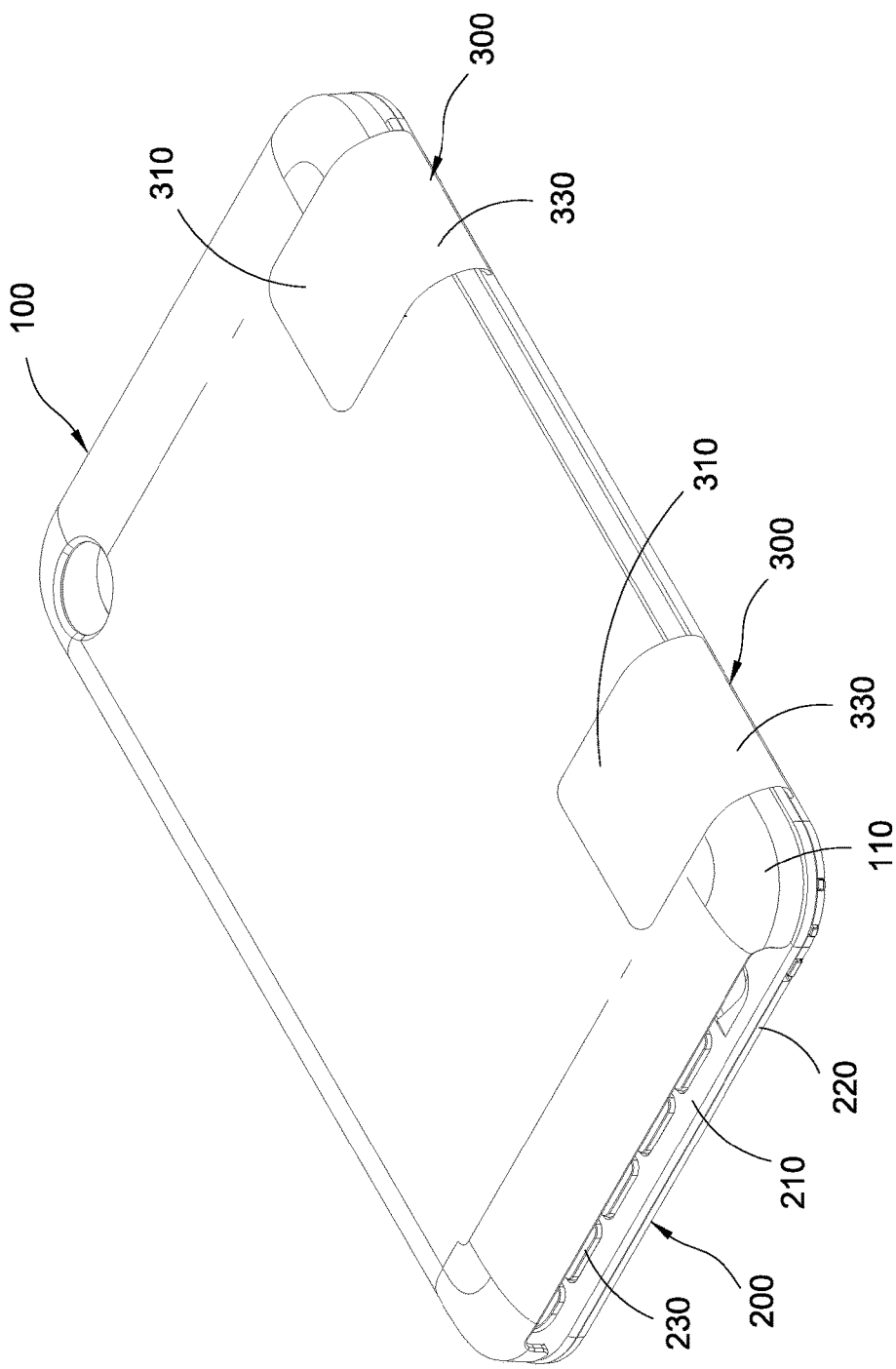
FIG. 10 is a perspective view of a protective case according to the fourth embodiment of the present invention.

Referring to FIG. 10, the fourth embodiment of the present invention provides a protective case which has a structure similar to the foregoing first embodiment. The similarities between the present embodiment and the first embodiment are not repeated while their differences are described hereinafter. According to the present embodiment, the protective case includes a housing 100, a base 200, and a plurality of connecting pieces 300. A structure of each connecting piece 300 is the same as that described in the first embodiment. On one surface of the housing 100, a plurality of locating slots 102 are concavely disposed and lined on a lateral edge 110 of the housing 100 and are disposed corresponding to the connecting pieces 300 respectively. The locating slots 102 are arranged in a symmetrical manner. In the present embodiment, if a connector is disposed on the lateral edge of the portable electronic device 10 and between the plurality of the connecting pieces 300, intervals of the plurality of the connecting pieces 300 can also allow a connecting cable to be inserted into and connected to the connector.

It is to be understood that the above descriptions are merely preferable embodiments of the present invention and not intended to limit the scope of the present invention. Equivalent changes and modifications made in the spirit of the present invention are regarded as falling within the scope of the present invention.

What is claimed is:

1. A protective case, comprising:

a housing;

a base, a supporting groove concavely disposed on one surface of the base for engaging with a lateral edge of the housing and supporting the housing to inclinedly stand on the base; and a connecting piece, the connecting piece being soft, bendable, and flexible, the connecting piece having two opposite end portions and a middle section disposed between the two end portions, the two end portions being connected to the housing and the base respectively, wherein the connecting piece provides to the housing a pulling force relative to the base and thereby prevents the housing from toppling and falling off from the supporting groove when the housing is inclined forward or is detached;

wherein one of the end portions of the connecting piece is attached to one surface of the housing;

wherein a locating slot is concavely disposed on the one surface of the housing and has a shape corresponding to a contour of the one of the end portions, and the one of the end portions is always attached inside the locating slot when the housing covers the base and when the housing covers inclinedly stands on the base; and wherein a clasping member is disposed on the lateral edge of the housing, and a contacting portion is protrudingly disposed inside the supporting groove to correspondingly engage with the clasping member to prevent the housing from falling backward outside of the supporting groove.

2. The protective case of claim 1, wherein an accommodating space is formed at the other surface of the housing.

3. The protective case of claim 1, wherein the other of the end portions of the connecting piece is attached to a surface of the base.

4. The protective case of claim 1, wherein the base comprises a top cover and a bottom cover correspondingly closed, the supporting groove is formed on the top cover, and one of the end portions of the connecting piece is sandwiched between the top cover and the bottom cover.

5. The protective case of claim 1, wherein an input device is disposed on the base.

6. The protective case of claim 1, comprising a plurality of connecting pieces.

7. The protective case of claim 1, wherein a through hole is formed on the middle section of the connecting piece.

8. The protective case of claim 1, wherein a total length from where the middle section of the connecting piece connects the housing to the lateral edge of the housing is approximately equal to a length of the middle section.

9. The protective case of claim 1, wherein a material composing the connecting piece includes PU, knitted fabric, or leather.

* * * * *